(12) United States Patent
    Queru

(10) Patent No.: US 9,058,189 B1
(45) Date of Patent: Jun. 16, 2015

(54) AUTOMATIC USER ACCOUNT SELECTION FOR LAUNCHING AN APPLICATION

(75) Inventor: Jean-Baptiste Maurice Queru, Foster City, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 13/570,181

(22) Filed: Aug. 8, 2012

(51) Int. Cl.
    *G06F 13/00* (2006.01)
    *G06F 9/44* (2006.01)

(52) U.S. Cl.
    CPC .................... *G06F 9/4443* (2013.01)

(58) Field of Classification Search
    CPC .................................................. G06F 9/4443
    USPC ......................................................... 719/329
    See application file for complete search history.

(56) References Cited

U.S. PATENT DOCUMENTS

| 8,677,477 | B2* | 3/2014 | Kim et al. ................. 726/21 |
| 2007/0199072 | A1* | 8/2007 | Plummer .................. 726/26 |
| 2012/0095873 | A1* | 4/2012 | Narang et al. ............. 705/26.41 |
| 2012/0246555 | A1* | 9/2012 | Masten .................... 715/234 |

* cited by examiner

*Primary Examiner* — Andy Ho
(74) *Attorney, Agent, or Firm* — McDermott Will & Emery LLP

(57) ABSTRACT

A system and method is provided for selecting an appropriate user account for accessing an application, the system, the method including receiving a request to launch an application while in a first user account, identifying a plurality of user accounts including the first user account, selecting one of the plurality of identified user accounts for launching the application, wherein the selected one of the plurality of user accounts provides functionality for launching the application and providing the user with access to the selected one of the plurality of identified user accounts.

20 Claims, 4 Drawing Sheets

AUTOMATIC USER ACCOUNT SELECTION FOR LAUNCHING AN APPLICATION

BACKGROUND

The subject disclosure generally relates to multi-account systems, and, in particular, to launching an application within a multi-account system.

Service providers may allow users to create one or more user accounts (e.g., personal, corporate, multi-user). Each user account may be accessible using a unique login (e.g., a user name and password), and provides access to one or more applications, including for example, e-mail, instant messaging, shopping, reader and calendar. Settings, content and history associated with applications are separately maintained for each user account.

When launching applications from a first user account, the applications from that user account will be launched, even where the user may wish to access the settings and content of the application on a different user account. The user then has to manually switch to the user account from which the user actually wishes to launch application.

Thus, a mechanism for automatically selecting the appropriate user account for an application launched by a user may be desirable.

SUMMARY

The disclosed subject matter relates to a machine-implemented method comprising receiving a request to launch an application while in a first user account. The method further comprising identifying a plurality of user accounts including the first user account. The method further comprising selecting one of the plurality of identified user accounts for launching the application, wherein the selected one of the plurality of user accounts provides functionality for launching the application and providing the user with access to the selected one of the plurality of identified user accounts.

These and other aspects can include one or more of the following features. The method may further comprise launching the application within the selected one of the plurality of identified user accounts. Identifying the plurality of user accounts may comprise determining that the user is logged into the plurality of user accounts. Identifying the plurality of user accounts may comprise identifying a second user account having a predetermined relationship with the first user account, wherein the plurality of user accounts further includes the second user account.

Selecting the one of the plurality of identified user accounts may comprise identifying a preferred user account associated with the application and selecting the preferred user account as the one of the plurality of identified user accounts.

Identifying the preferred user account comprises accessing user settings associated with the application, and identifying the preferred user account, wherein the preferred user account comprises a user account indicated as the preferred user account for launching the application as indicated by the user settings.

Selecting the one of the plurality of identified user accounts may comprise comparing the plurality of identified user accounts based on one or more criteria and selecting the one of the plurality of identified user accounts based on the comparing.

Comparing the plurality of identified user accounts may comprise calculating a score for each of the plurality of identified user accounts according to the one or more criteria and comparing the plurality of identified user accounts based on the score.

Selecting the one of the plurality of identified user accounts may further comprise identifying the one of the plurality of identified user accounts based on the comparing, determining whether the identified one of the plurality of user accounts meets a degree of confidence and selecting the identified one of the plurality of user accounts when it is determined that the identified one of the plurality of user accounts meets the degree of confidence.

Selecting the one of the plurality of identified user accounts may further comprise providing the one of the plurality of identified user accounts for display to the user when it is determined that the one of the plurality of identified user accounts does not meet the degree of confidence, identifying a user selection of the one of the plurality of identified user accounts and selecting the one of the plurality of identified user accounts in response to the user selection.

Selecting the one of the plurality of identified user accounts may comprise identifying two or more of the plurality of identified user accounts based on the comparing, providing the two or more identified user accounts for display to the user, identifying a user selection of one of the two or more identified user accounts and selecting the one of the two or more identified user accounts as the one of the plurality of identified user accounts for launching the application. The one or more criteria may comprise a volume of content associated with the application maintained at each of the plurality of identified user accounts.

The one or more criteria may comprise the level of activity of the user with respect to the application in association with each of the plurality of identified user accounts, wherein the level of activity of the application for each of the plurality of user accounts includes at least one of a number of times the user accesses the application at the user account, the duration of the access, or the recency of the activity. The one or more criteria may comprise the location of the user at the time of the request, wherein the location of the user may be determined based on at least one of a GPS location or an internet domain location. The one or more criteria may comprise the time at which the request to access the application is identified.

The disclosed subject matter also relates to a system comprising one or more processors and a machine-readable medium comprising instructions stored therein, which when executed by the processors, cause the processors to perform operations comprising receiving a request to launch an application while in a first user account. The operations further comprising determining whether a preferred user account of a plurality of user accounts including the first user account is associated with the application. The operations further comprising launching the application within the preferred user account when a preferred user account is associated with the application. The operations further comprising comparing the plurality of user accounts based on one or more criteria and selecting one of the plurality of user accounts for launching the application based on the comparing.

These and other aspects can include one or more of the following features. The operations may further comprise providing access to the selected one of the plurality of user accounts. The operations may further comprise launching the application within the selected one of the plurality of user accounts. The operations may further comprise providing the selected one of the plurality of user accounts for display to the user.

Other aspects can be embodied in corresponding systems and apparatus, including computer program products.

These and other aspects may provide one or more of the following advantages. Facilitating automatic selection of the appropriate user account for launching an application requested by a user, in systems which allow for multiple user accounts.

The disclosed subject matter also relates to a machine-readable medium comprising instructions stored therein, which when executed by a machine, cause the machine to perform operations comprising identifying a user request to launch an application while in a first user account. The operations further comprising identifying a plurality of user accounts including the first user account. The operations further comprising selecting one of the plurality of identified user accounts based on one or more criteria and providing access to the selected user account for launching the application.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
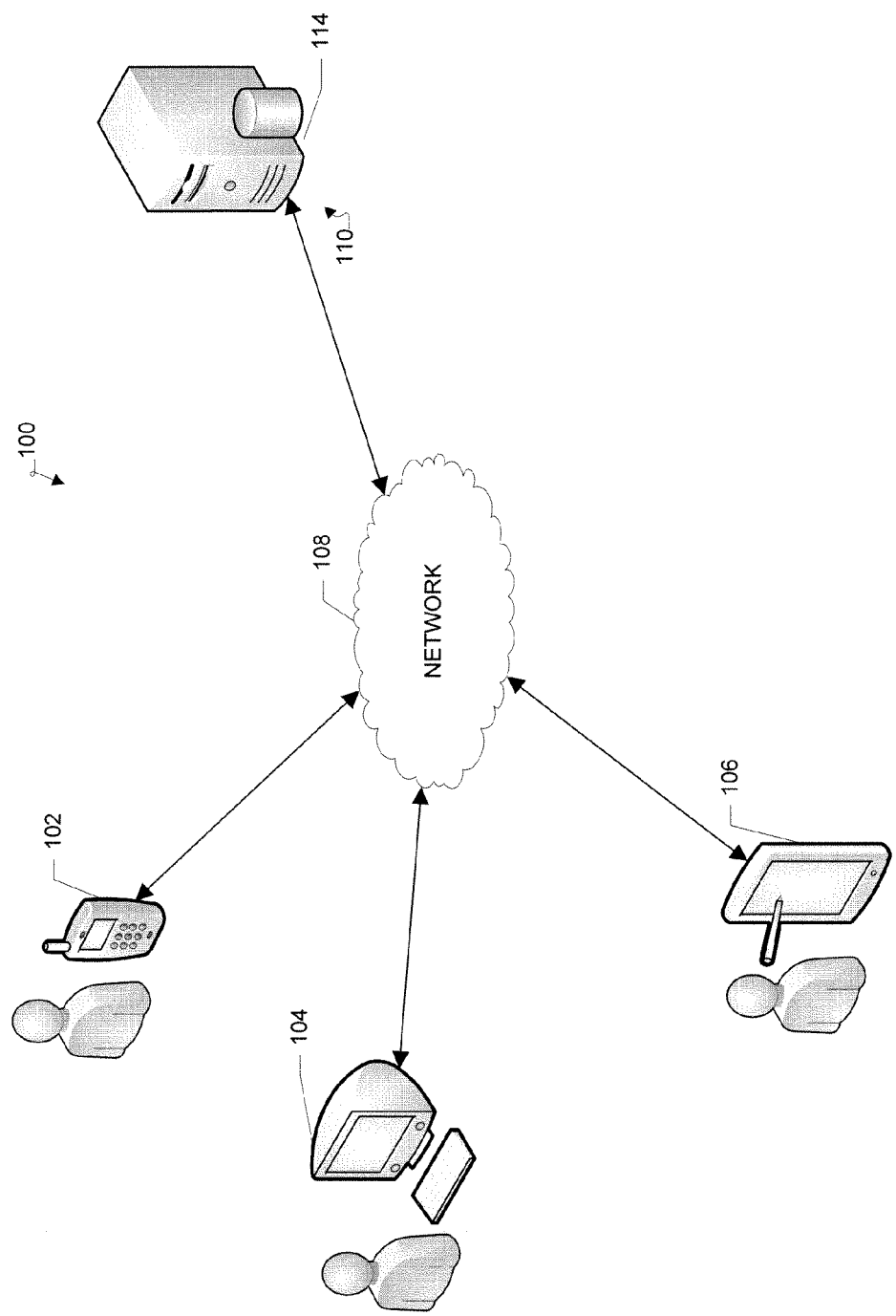
FIG. 1 illustrates an example client-server network environment which provides for automatic selection of a user account for launching an application.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, structures and components are shown in block diagram form in order to avoid obscuring the concepts of the subject technology.

As used herein, a "user account" refers to any account allowing a user to access a computer system, network, information service, browser, or other internet based or computer based services. A user account may define an established relationship between a user and a computer, network or information service and allows a user to access system services. User accounts may be assigned a username and password. To log in to an account, a user may be required to authenticate oneself with a password or other credentials for the purposes of accounting, security, logging, and resource management.

Various systems (e.g., internet service providers, gaming services, browsers) may allow users to create multiple user accounts (e.g., personal, corporate, multi-user). Some systems may further allow multiple user accounts to run simultaneously. These user accounts may all belong to the same user, or may belong to different users accessing the system through a common machine (e.g., game console, or computer) and/or a common browser. Each user account may be accessible using a unique login (e.g., a user name and password), and may provide access to one or more applications. Applications may include e-mail, instant messaging, shopping, reader, calendar, games, and other similar applications. Users may interact with applications associated with separate user accounts differently, and may have personalized setting, content and history with respect to certain applications on one or more user accounts. Usually, settings, content and history data regarding each application are separately maintained for each user account.

Selected systems (e.g., internet service providers) may offer the ability for the user to concurrently log into two or more user accounts. When the user logs into more than one user account, a first user account (e.g., the first user account the user logs into or the account the user is currently interacting with) may be selected as the primary user account. The applications associated with the primary user account may then be used each time the user requests to launch an application. The user may then manually switch to the user account from which the user actually wishes to launch the particular application.

Other systems may only allow the user to log into a single user account at one time, and the user may be required to manually log out of one user account and into a second user account if the user wishes to launch an application associated with the second user account. Thus, it is likely that in several instances the user will be presented with an incorrect instance of the application (e.g., the application running on the incorrect user account), and will have to manually switch the user account and reload the application with respect to the desired user account he/she intended to launch the application from (e.g., user account maintaining specific, content, settings or history with respect to the application).

The disclosed subject matter provides a system for automatically selecting the appropriate user account for launching an application requested by a user. The selection may be performed either where the user is concurrently logged into multiple user accounts or where the system is aware of user accounts associated with the user, the current user account (e.g., the first user account the user logs into or the account the user is currently interacting with), and/or the browser or computer the user is currently using. Once an appropriate user account is selected, the system may automatically provide access to the appropriate user account and launch the application (e.g., load the application) in the determined user account. Alternatively, the system may provide the appropriate user account for display to the user and the user may decide whether to access the appropriate user account and launch the application in the appropriate user account as identified by the system or to select another user account for loading the application.

FIG. 1 illustrates an example client-server network environment which provides for automatic selection of a user account for launching an application. A network environment 100 includes a number of electronic devices 102-106 communicably connected to a server 110 by a network 108. Server 110 includes a processing device 112 and a data store 114. Processing device 112 executes computer instructions stored in data store 114, for example, to assist in selecting an appropriate user account for launching an application requested by a user interacting with electronic devices 102-106.

In some example embodiments, electronic devices 102-106 can be computing devices such as laptop or desktop computers, smartphones, PDAs, portable media players, tablet computers, game consoles or other appropriate computing devices that can be used to for launching an application. In the example of FIG. 1, electronic device 102 is depicted as a mobile phone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). Furthermore, network 108 can be a public communication network (e.g., the Internet, cellular data network, dialup modems over a telephone network) or a private communications network (e.g., private LAN, leased lines).

A user interacting with a client device (e.g., electronic devices 102-106) may request to launch an application while logged into a first user account. The system (e.g., through server 110) may detect the user's request to launch the application and may determine one or more other user accounts associated with the user, the client device and/or the first user account. The system may then determine at least one appropriate user account for launching the application requested by the user. The appropriate user account may be the first user account or one of the one or more user accounts associated with the user, client device and/or first user account.

The system may automatically provide access to the appropriate user account and load the application within the appropriate user account (e.g., where the user is logged onto the user account). Prior to loading the application, the system may provide the appropriate user account(s) for display to the user (e.g., sending a data set containing the potential user account(s) to the user's client device and/or updating the graphical user interface displayed at the client device). The user may then select an appropriate user account to launch the application (e.g., a first one of the potential user accounts where more than one potential user account is provided for display to the user). Upon identifying the user's selection, the system may provide access to the selected user account and launch and execute the application associated with the selected appropriate user account. In one aspect, before loading the application the system may prompt the user to log into the appropriate user account (e.g., if the user is not currently logged into the appropriate user account).

Figure 2:
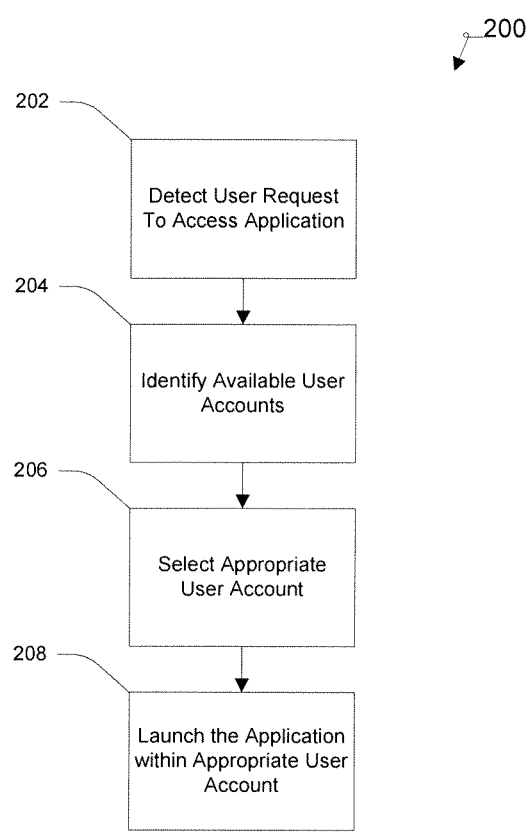
FIG. 2 illustrates a flow chart of a process for selecting an appropriate user account for launching an application requested by a user.

FIG. 2 illustrates a flow chart of a process 200 for selecting an appropriate user account for launching an application requested by a user. In step 202, the system detects a user request to launch an application. The request may be identified in response to the user interacting with a graphical user interface at a client device (e.g., electronic devices 102-106). For example, the user may select the application, or a document or link associated with the application using an input device coupled to the client device. The request to launch the application may be received while the user is logged into at least a first user account.

In step 204, the system identifies user accounts available for launching the application. The user may request to launch an application while logged into at least the first user account. The system may identify one or more available user accounts for launching the application running on the client device and/or associated with the user. The user (or client device) may be simultaneously logged into multiple user accounts providing functionality for launching the application, and the system may identify those user accounts as available user accounts for launching the application. The user accounts may be specifically linked to the user or may be user accounts running on the client device of the user (e.g., user accounts of other users).

Similarly, the available user accounts may include user accounts that the user is not currently logged into. The system may have access to data regarding multiple user accounts associated with the user, the client device and/or the first user account that the user is currently logged into. Such information may include, for example, other user accounts historically used concurrently with the first user account, user accounts used previously by the user and/or user accounts previously accessed at the client device. Thus, the available user accounts may include the first user account and additional user accounts identified by the system.

Next, in step 206, the system selects an appropriate user account for launching the application. The system may select the appropriate user account for the application based on several criteria. The user may explicitly indicate preferences or settings with respect to the preferred user accounts used for the application. Accordingly, the system may determine whether the user has selected a preferred user account for launching the application when selecting the appropriate user account. In one aspect, the system may select the user account indicated by the user as the appropriate user account (e.g., as indicated by an explicit setting).

Other criteria may include whether the application is enabled and/or activated, the contents associated with the application on each available user account (e.g., amount of content available associated with the application), the activity level of the application with respect to each available user account, the location of the user (e.g., physical or domain location), the time at which the request to launch the application is received, the manner in which the request is received (e.g., by interacting with a particular user account), as well as historical data associated with the application and/or user accounts.

The system may identify one or more potential user accounts that are optimal for launching the application according to the criteria. Upon identifying the one or more of the potential user accounts (e.g., user accounts optimal for launching the application according to the criteria), the system may present the identified potential user accounts to the user (e.g., when the potential user account does not meet a degree of confidence or where more than one potential user account is identified) and may prompt the user to select the appropriate user account. The system may then select the appropriate user account based on user selection. An exemplary process for selecting the appropriate user account is described in further detail below with respect to FIG. 3.

Finally, in step 208, the system provides access to the selected appropriate user account and launches the application within the selected appropriate user account. The system may reroute the user to the appropriate user account (e.g., where the appropriate account is different from the first account) and may load the application within the appropriate user account. In one aspect, the system may prompt the user to log into the selected user account before launching the application.

Figure 3:
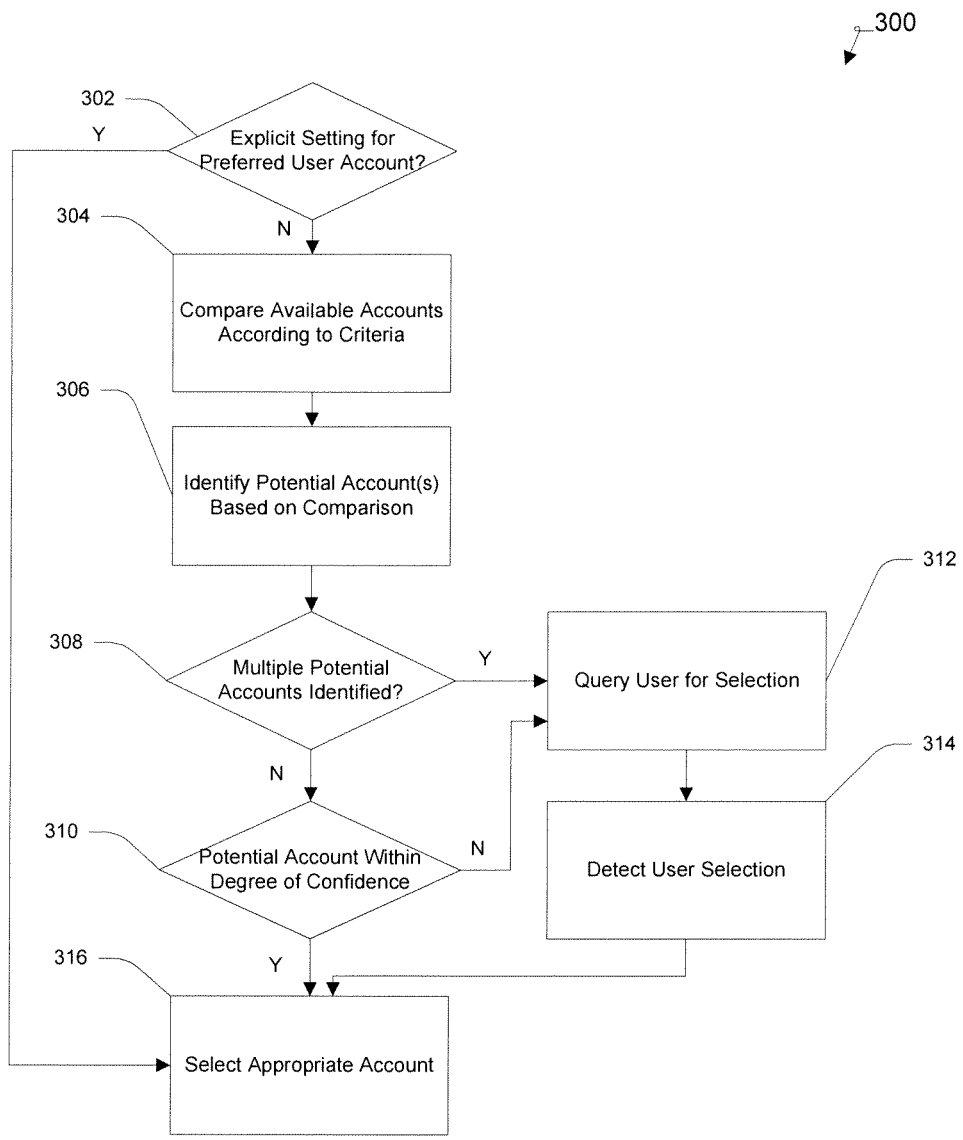
FIG. 3 illustrates a process for selecting an appropriate user account for launching an application in response to a request from a user.

FIG. 3 illustrates a process 300 for selecting an appropriate user account for launching an application in response to a request from a user. In step 302, the system may determine whether an explicit setting is provided by the user regarding launching the application. The user may explicitly indicate a preferred user account to be used for launching an application. Accordingly, the system may determine whether the user has selected a preferred user account for launching the application when selecting the appropriate user account. The system may access and analyze the application or account settings for a user to determined whether a preferred user account has been selected for launching the application by the user (e.g., indicated as a explicit setting associated with the user, user account or application).

If it is determined that the user selected a preferred user account (e.g., an explicit setting is provided by the user), the process may continue to step 316, and the system may select the preferred user account indicated by the user as the appropriate user account for launching the application (e.g., as indicated by the explicit settings). Alternatively, the user's explicit setting may be used as one of the one or more criteria used for identifying an appropriate user account. For example, the system may not automatically select the preferred user account as the appropriate user account, but may give the preferred user account a priority or preference value during the comparison performed in step 304. Similarly, if in step 302, it is determined that the user has not indicated a preferred user account (e.g., no explicit setting is available), the process continues to step 304.

In step 304, the system may compare available user accounts (e.g., user accounts identified in step 204 of process 200) according to one or more criteria to identify one or more potential user accounts for launching the application. The criteria may include whether the application is enabled and/or activated at each of the available user accounts, the contents associated with the application on each available user account (e.g., amount of content available associated with the application), the activity level of the application with respect to each available user account, the location of the user (e.g., physical or domain location), the time at which the request to launch the application is received, the manner in which the request is received (e.g., by interacting with a particular user account), as well as historical data associated with the application and/or user accounts. As described above, the user's explicit settings with respect to a preferred account may also be used as a criterion for identifying one or more potential user accounts.

Each available user account (e.g., the user accounts identified in step 204) may include a different set of enabled or activated applications. The system may determine if one or more of the available user accounts provide functionality for launching the application and/or whether the application is activated at one or more of the available user accounts. Additionally, the system may look at the content stored with respect to the application at each available user account and may identify the available user accounts having content, settings or history with respect to the application. The system may further determine the available user accounts having the largest volume of content, settings or history (e.g., with respect to a reader application the system may determine which reader application has the largest selection of books).

The system may further look at the amount of activity with respect to the application for each user account (e.g., overall activity and/or recent activity with respect to a period of time). Each user account may provide access to the application. The system may determine an activity level including the amount and nature of interaction and activity with respect to the application associated with each user account. The activity level may be determined based on various criteria such as the number of times the application associated with the user account was accessed, the activity performed within the application associated with the account, the number of resources accessed through the application, the recency of the activity (e.g., the date the application associated with the user account was last accessed) and other related application. The determination may be made with respect to all activity performed within the application associated with the specific account or activity within a predetermined amount of time (e.g., within the previous 30 days).

Additionally, the location of the user (e.g., physical location or internet domain), as well as the time at which the request to launch the application is received, may be used to select the appropriate user account. For example, when launching the calendar application, the location of the user and the time of the day may be used to determine whether to launch the calendar application within the user's corporate user account or personal user account. Additionally, the system may determine the origin of the request for launching the application (e.g., the user account the user is logged into) when selecting the appropriate user account. The system may additionally have access to historical information regarding the user account such as the user account(s) most often used when launching the application, and may identify the potential user accounts based on the historical data.

In one aspect, a combination of one or more of the above criteria may be used when selecting the one or more potential user accounts. In one aspect, each available user account may be assigned a score according to the one or more criteria described above. Various criteria may be given different weight and/or importance in calculating the score for each user account. For example, where an explicit setting is provided by the user and considered as a criterion in identifying the appropriate user account, the system may assign a higher preference or weight to this criterion, such that the user's preferred user account may be favored in comparison to other available user accounts.

In step 306, the system may identify at least one potential user account for launching the application based on the comparison performed in step 304. For example, the potential user account may be selected based on the score computed for each available user account in step 304 (e.g., the available user account with the highest calculated score). The system may identify more than one potential user account if two or more available user accounts are equally optimal for launching the application (e.g., two or more available user accounts have the same score).

In step 308, the system may determine whether multiple potential user accounts have been identified. If only one potential user account has been identified, in step 310, the system may determine whether the potential user account meets a certain degree of confidence. The degree of confidence may be represented by a confidence value associated with the user, the application or the user's client device. The confidence value may refer to a threshold score or relationship that indicates the system's confidence in automatically launching an application without querying the user. The confidence value may be indicated by the user and/or the system. For example, where a score is calculated for each available user account, the confidence value may be a certain threshold score.

Furthermore, the degree of confidence may include other conditions. The user may indicate a desired degree of confidence by specifying the conditions to be met before the user is prompted for selection of the appropriate user account (i.e., the system is authorized to make an automatic selection). The user may choose to always be prompted before the system selects an appropriate user account or may alternatively choose for the system to automatically launch the application within an appropriate account without notifying the user, or may indicate a relationship or confidence value to be met before the user is notified of the account selection. The degree of confidence may further be based upon and/or modified according to historical data (e.g., the number of times the system's appropriate user account selection was accurate). In step 310, the system accesses the degree of confidence (e.g., pertaining to the user and/or application) and determines if the identified potential user account meets the degree of confidence (e.g., including one or more relationships and/or conditions).

If the system determines that more than one potential user account has been identified (step 308) and/or that the identified potential user account does not meet the degree of confidence (step 310), in step 312, the system prompts the user to select the appropriate user account. For example, the potential user account(s) may be presented for display to the user, and the user may select the appropriate user account to launch the application. In one aspect, the user may further be able to choose a different user account (e.g., a user account not listed as a potential user account) as the appropriate user account for launching the application.

In step 314, the system receives the user's selection and continues to step 316. Similarly, if in step 310 it is determined that the potential user account meets the degree of confidence, the system may continue to step 316. In step 316, the system selects the potential user account meeting the degree of confidence and/or selected by the user as the appropriate user account for launching an application requested by the user.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
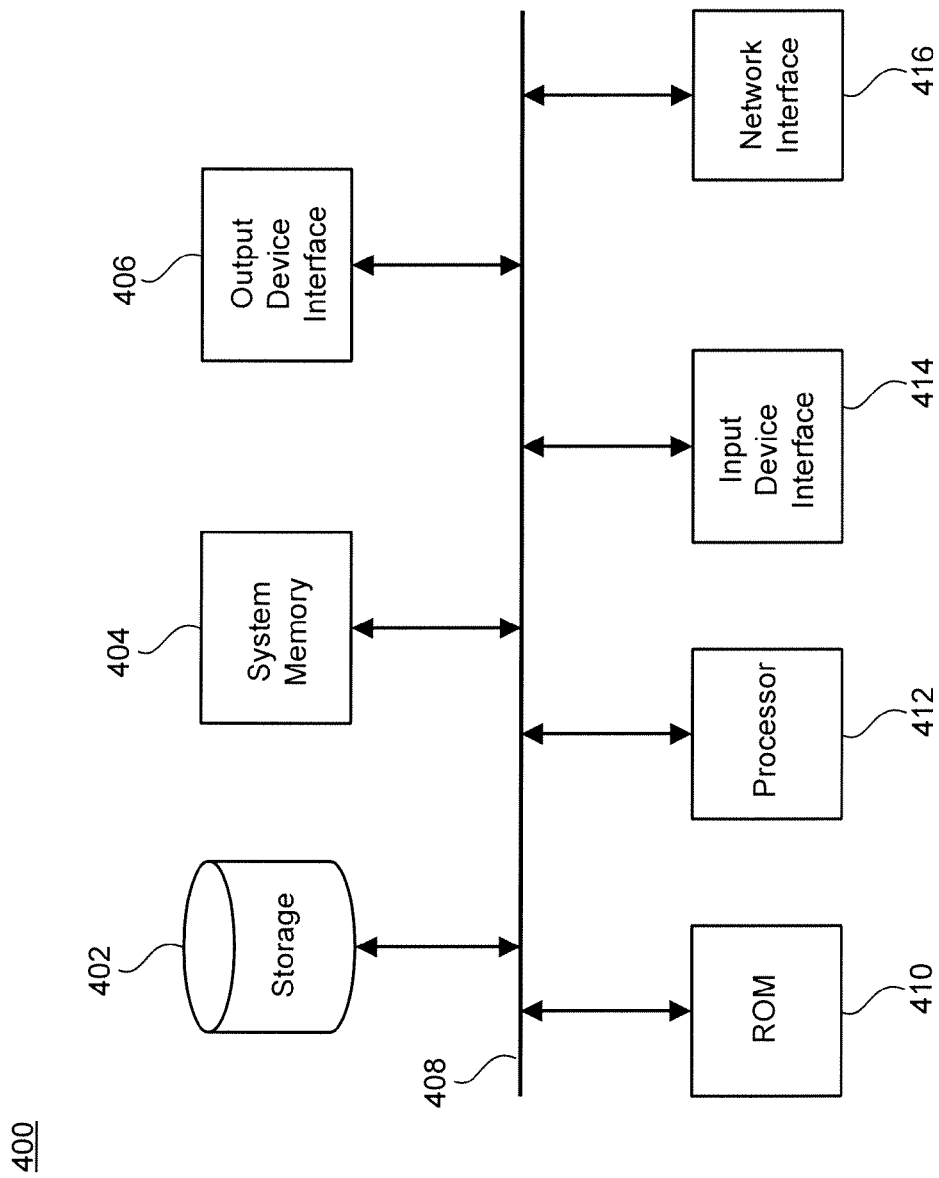
FIG. 4 conceptually illustrates an electronic system with which some implementations of the subject technology are implemented.

FIG. 4 conceptually illustrates an electronic system with which some implementations of the subject technology are implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for selecting and/or providing access to an appropriate user account for launching an application in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving a request to launch an application while in a first user account;
   identifying a plurality of user accounts including the first user account;
   selecting one of the plurality of identified user accounts for launching the application, wherein the selected one of the plurality of user accounts provides functionality for launching the application; and
   providing a user with access to the selected one of the plurality of identified user accounts.

2. The method of claim 1, further comprising:
   launching the application within the selected one of the plurality of identified user accounts.

3. The method of claim 1, wherein the identifying the plurality of user accounts comprises determining that the user is logged into the plurality of user accounts.

4. The method of claim 1, wherein the identifying the plurality of user accounts comprises:
   identifying a second user account having a predetermined relationship with the first user account, wherein the plurality of user accounts further includes the second user account.

5. The method of claim 1, wherein selecting the one of the plurality of identified user accounts comprises:
   identifying a preferred user account associated with the application; and
   selecting the preferred user account as the one of the plurality of identified user accounts.

6. The method of claim 5, wherein identifying the preferred user account comprises accessing user settings associated with the application, and identifying the preferred user account, wherein the preferred user account comprises a user account indicated as the preferred user account for launching the application as indicated by the user settings.

7. The method of claim 1, wherein selecting the one of the plurality of identified user accounts comprises:
   comparing the plurality of identified user accounts based on one or more criteria; and
   selecting the one of the plurality of identified user accounts based on the comparing.

8. The method of claim 7, wherein comparing the plurality of identified user accounts comprises:
   calculating a score for each of the plurality of identified user accounts according to the one or more criteria; and
   comparing the plurality of identified user accounts based on the score.

9. The method of claim 7, wherein selecting the one of the plurality of identified user accounts further comprises:
   identifying the one of the plurality of identified user accounts based on the comparing;
   determining whether the identified one of the plurality of user accounts meets a degree of confidence; and
   selecting the identified one of the plurality of user accounts when it is determined that the identified one of the plurality of user accounts meets the degree of confidence.

10. The method of claim 9, wherein selecting the one of the plurality of identified user accounts further comprises:
    providing the one of the plurality of identified user accounts for display to the user when it is determined that the one of the plurality of identified user accounts does not meet the degree of confidence;
    identifying a user selection of the one of the plurality of identified user accounts; and selecting the one of the plurality of identified user accounts in response to the user selection.

11. The method of claim 7, wherein selecting the one of the plurality of identified user accounts comprises:
    identifying two or more of the plurality of identified user accounts based on the comparing;
    providing the two or more identified user accounts for display to the user;
    identifying a user selection of one of the two or more identified user accounts; and
    selecting the one of the two or more identified user accounts as the one of the plurality of identified user accounts for launching the application.

12. The method of claim 7, wherein the one or more criteria comprises a volume of content associated with the application maintained at each of the plurality of identified user accounts.

13. The method of claim 7, wherein the one or more criteria comprises a level of an activity of the user with respect to the application in association with each of the plurality of identified user accounts, wherein the level of the activity of the application for each of the plurality of user accounts includes at least one of a number of times the user accesses the application at the user account, a duration of the access, or a recency of the activity.

14. The method of claim 7, wherein the one or more criteria comprise a location of the user at a time of the request, wherein the location of the user may be determined based on at least one of a physical location or an internet domain location.

15. The method of claim 7, wherein the one or more criteria comprises a time at which the request to access the application is identified.

16. A system comprising:
    one or more processors; and
    a machine-readable medium comprising instructions stored therein, which when executed by the processors, cause the processors to perform operations comprising:

receiving a request to launch an application while in a first user account;

determining whether a preferred user account of a plurality of user accounts including the first user account is associated with the application;

launching the application within the preferred user account when a preferred user account is associated with the application;

comparing the plurality of user accounts based on one or more criteria; and selecting one of the plurality of user accounts for launching the application based on the comparing.

17. The system of claim 16, the operations further comprising:

providing access to the selected one of the plurality of user accounts.

18. The system of claim 17, the operations further comprising:

launching the application within the selected one of the plurality of user accounts.

19. The system of claim 16, the operations further comprising:

providing the selected one of the plurality of user accounts for display to a user.

20. A machine-readable medium comprising instructions stored therein, which when executed by a machine, cause the machine to perform operations comprising:

identifying a user request to launch an application while in a first user account;

identifying a plurality of user accounts including the first user account;

selecting one of the plurality of identified user accounts based on one or more criteria; and providing access to the selected user account for launching the application.

* * * * *